(12) United States Patent
Kwack et al.

(10) Patent No.: US 11,950,347 B2
(45) Date of Patent: Apr. 2, 2024

(54) INDUCTION HEAT COOKING APPARATUS TO IMPLEMENT WPT AND PFC POWER CONVERTER

(71) Applicants: LG Electronics Inc., Seoul (KR); ULSAN NATIONAL INSTITUTE OF SCIENCE AND TECHNOLOGY, Ulsan (KR)

(72) Inventors: Younghwan Kwack, Seoul (KR); Jaekyung Yang, Seoul (KR); Seongho Son, Seoul (KR); Yongsoo Lee, Seoul (KR); Jeehoon Jung, Ulsan (KR); Hwapyeong Park, Ulsan (KR); Mina Kim, Ulsan (KR)

(73) Assignees: LG ELECTRONICS, Seoul (KR); ULSAN NATIONAL INSTITUTE OF SCIENCE AND TECHNOLOGY, Ulsan (KR)

( * ) Notice: Subject to any disclaimer, the term of this patent is extended or adjusted under 35 U.S.C. 154(b) by 613 days.

(21) Appl. No.: 17/142,819

(22) Filed: Jan. 6, 2021

(65) Prior Publication Data
US 2021/0127461 A1 Apr. 29, 2021

Related U.S. Application Data

(63) Continuation of application No. 15/862,537, filed on Jan. 4, 2018, now Pat. No. 10,925,123.

(30) Foreign Application Priority Data

Jan. 4, 2017 (KR) .................. 10-2017-0001213

(51) Int. Cl.
*H05B 6/06* (2006.01)
*F24C 15/10* (2006.01)
(Continued)

(52) U.S. Cl.
CPC .......... *H05B 6/065* (2013.01); *F24C 15/106* (2013.01); *H02M 3/06* (2013.01); *H02M 7/103* (2013.01);
(Continued)

(58) Field of Classification Search
CPC ...... H05B 6/065; H05B 1/0202; H05B 6/062; H05B 6/1236; F24C 15/106; H02M 3/06; H02M 7/103; Y02B 40/00
See application file for complete search history.

(56) References Cited

U.S. PATENT DOCUMENTS

| 4,996,405 A | 2/1991 | Poumey et al. |
| 7,151,242 B2 | 12/2006 | Schuler |

(Continued)

FOREIGN PATENT DOCUMENTS

| EP | 0394148 | 10/1990 |
| EP | 1341401 | 9/2003 |

(Continued)

OTHER PUBLICATIONS

European Extended Search Report in European Appln. No. 18150131.3, dated May 23, 2018, 5 pages.

*Primary Examiner* — Nathaniel E Wiehe
*Assistant Examiner* — Theodore J Evangelista
(74) *Attorney, Agent, or Firm* — Fish & Richardson P.C.

(57) ABSTRACT

An induction heat cooking apparatus that includes: a rectifier that is configured to convert alternating current (AC) voltage supplied from an external power source into direct current (DC) voltage; an inverter that is configured to generate current based on DC voltage received from the rectifier and provide the current to output nodes; heating coils that are configured to, based on the current generated by the inverter, generate magnetic fields for providing heat; a first capacitive unit that includes one or more resonance capacitors and that (Continued)

is coupled between the output nodes; a second capacitive unit that includes one or more wireless power transfer (WPT) capacitors and that is configured to be coupled between the output nodes; and a mode conversion switch that is configured to couple the second capacitive unit to the first capacitive unit in parallel is disclosed.

19 Claims, 13 Drawing Sheets

(51) Int. Cl.
  *H02M 3/06* (2006.01)
  *H02M 7/10* (2006.01)
  *H05B 1/02* (2006.01)
  *H05B 6/12* (2006.01)

(52) U.S. Cl.
  CPC ........... *H05B 1/0202* (2013.01); *H05B 6/062* (2013.01); *H05B 6/1236* (2013.01); *Y02B 40/00* (2013.01)

(56) References Cited

U.S. PATENT DOCUMENTS

| | | | |
|---|---|---|---|
| 7,463,499 | B2 | 12/2008 | Larson, III |
| 9,590,444 | B2 | 3/2017 | Walley et al. |
| 10,085,592 | B1 | 10/2018 | Cheng |
| 10,476,494 | B2 | 11/2019 | Suh et al. |
| 10,477,625 | B2 | 11/2019 | Blasco Rueda et al. |
| 10,477,626 | B2 | 11/2019 | Tran et al. |
| 2007/0258274 | A1 | 11/2007 | Richter |
| 2012/0305546 | A1* | 12/2012 | Filippa ............... H05B 6/062 219/660 |
| 2015/0349625 | A1* | 12/2015 | Hyoung ............. H02M 1/4208 363/46 |
| 2016/0301299 | A1 | 10/2016 | Pan et al. |
| 2018/0245794 | A1 | 8/2018 | Mao et al. |

FOREIGN PATENT DOCUMENTS

| | | |
|---|---|---|
| KR | 100186482 | 12/1998 |
| KR | 1020110104987 | 9/2014 |
| WO | WO9120172 | 12/1991 |
| WO | WO2013103939 | 7/2013 |
| WO | WO2014068992 | 9/2016 |

* cited by examiner

INDUCTION HEAT COOKING APPARATUS TO IMPLEMENT WPT AND PFC POWER CONVERTER

CROSS-REFERENCE TO RELATED APPLICATIONS

The present application is a continuation of U.S. application Ser. No. 15/862,537, filed on Jan. 4, 2018, which claims priority under 35 U.S.C. 119 and 35 U.S.C. 365 to Korean Patent Application No. 10-2017-0001213 filed on Jan. 4, 2017, which are hereby incorporated by reference in their entirety.

BACKGROUND

The present application relates to an induction heat cooking apparatus and a method for operating the induction heat cooking apparatus.

The markets for electric ranges are gradually increasing. This is because electric ranges do not generate carbon monoxide during a combustion process, and the risk of safety accidents such as gas leakage or fire is low.

Electric ranges include highlight-type electric ranges for converting electricity into heat by using a Nichrome wire having high electrical resistance and induction-type electric ranges for generating magnetic fields to apply heat through an induction heating method.

Induction heat cooking apparatuses may mean electric ranges that operate according to an induction method. A specific operation principle of induction heat cooking apparatuses will be described as follows.

Generally, in such an induction heat cooking apparatus, high frequency current flows through a working coil or a heating coil, which is provided in the induction heat cooling apparatus. When the high frequency current flows through the working coil or the heating coil, lines of strong magnetic force are generated. The lines of the magnetic force generated in the working coil or the heating coil generate eddy current when passing through a cooking device. Thus, since the eddy current flows through the cooking device, heat is generated to heat a container itself. Then, since the container is heated, contents within the container are heated.

As described above, the induction heat cooking apparatus is an electric cooking apparatus using a principle of inducing heat to the cooking device itself to heat the contents. When the induction heat cooking apparatus is used, pollution of indoor air may be reduced because oxygen is not consumed, and exhaust gases are not exhausted. In addition, the induction heat cooking apparatus has high energy efficiency and stability, and also, the container itself is heated to reduce a risk of burns.

SUMMARY

In general, one innovative aspect of the subject matter described in this specification can be implemented in an induction heat cooking apparatus comprising: a rectifier that is configured to convert alternating current (AC) voltage supplied from an external power source into direct current (DC) voltage; an inverter that is configured to generate current based on DC voltage received from the rectifier and provide the current to output nodes; heating coils that are configured to, based on the current generated by the inverter, generate magnetic fields for providing heat; a first capacitive unit that includes one or more resonance capacitors and that is coupled between the output nodes; a second capacitive unit that includes one or more wireless power transfer (WPT) capacitors and that is configured to be coupled between the output nodes; and a mode conversion switch that is configured to couple the second capacitive unit to the first capacitive unit in parallel.

The foregoing and other implementations can each optionally include one or more of the following features, alone or in combination. In particular, one implementation includes all the following features in combination. The induction heat cooking apparatus further includes: a driving unit that is configured to open or close the mode conversion switch, wherein, in a state in which the mode conversion switch is closed, the first capacitive unit is coupled to the second capacitive unit in parallel, and wherein, in a state in which the mode conversion switch is opened, the first capacitive unit is decoupled from the second capacitive unit. The induction heat cooking apparatus further includes: a sensing unit configured to detect a type of an object that is located on the induction heat cooking apparatus, wherein the driving unit is configured to, based on the type of the object, control the mode conversion switch. The driving unit is configured to, (i) in a state in which the object is to be heated, open the mode conversion switch and, (ii) in a state in which the object is to receive wireless power, close the mode conversion switch. The induction heat cooking apparatus further includes: an interface unit that is configured to receive data about an operation mode of the induction heat cooking apparatus, wherein the driving unit is configured to, based on the operation mode of the induction heat cooking apparatus, control the mode conversion switch. The driving unit is configured to, (i) in a state in which the operation mode is a cooking device heating mode, open the mode conversion switch and, (ii) a state in which the operation mode is a wireless power transfer mode, close the mode conversion switch. The first capacitive unit comprises: a first resonance capacitor that is coupled between a first output node of the output nodes and a first node, and a second resonance capacitor that is coupled between the first node and a second output node of the output nodes, wherein the first node is coupled to the heating coils. The second capacitive unit comprises: a first WPT capacitor that is configured to be coupled to the first resonance capacitor in parallel, and a second WPT capacitor that is configured to be coupled to the second resonance capacitor in parallel. The mode conversion switch comprises: a first mode conversion switch that is configured to couple the first WPT capacitor to the first resonance capacitor in parallel, and a second mode conversion switch that is configured to couple the second WPT capacitor to the second resonance capacitor in parallel.

In general, another innovative aspect of the subject matter described in this specification can be implemented in a wireless power receiving device comprising: a receiving coil that is configured to receive AC power from an induction heat cooking apparatus; a power factor correction (PFC) power converter that is configured to, based on the AC power received from the receiving coil, generate a first voltage that has a fixed value; and a variable load that is configured to have a variable resistance value in a state in which the PFC power converter is configured to drive the variable load with the first voltage.

The foregoing and other implementations can each optionally include one or more of the following features, alone or in combination. In particular, one implementation includes all the following features in combination. The PFC power converter comprises: a rectifier that is configured to rectify the AC power supplied from the receiving coil into DC power; and a PFC circuit that is configured to generate the first voltage based on the DC power rectified by the rectifier. The PFC circuit is configured to generate the first voltage based on a waveform of the DC power rectified by the rectifier. The PFC circuit comprises: an inductor that is configured to receive an input voltage from the rectifier; a FET switch that is configured to, (i) in a state in which the FET switch is turned on, charge the inductor and, (ii) in a state in which the FET switch is turned off, discharge the inductor; a PFC controller that is configured to turn on or off the FET switch; and an output capacitor that is configured to, in a state in which the inductor is discharged to (i) provide current to the output capacitor and (ii) provide a second voltage higher than the input voltage to the output capacitor, filter a high frequency portion of the second voltage.

In general, another innovative aspect of the subject matter described in this specification can be implemented in a method for operating an induction heat cooking apparatus that includes a mode conversion switch and a heating coil, the method comprising: detecting a type of an object; controlling, (i) in a state in which the object is to be heated, the mode conversion switch to be opened and, (ii) in a state in which the object is to receive wireless power, the mode conversion switch to be closed; and generating magnetic fields associated with a resonance frequency that is based on synthetic capacitance of the mode conversion switch and inductance of the heating coil, wherein a value of the synthetic capacitance is variable based on the mode conversion switch being opened or closed.

The foregoing and other implementations can each optionally include one or more of the following features, alone or in combination. In particular, one implementation includes all the following features in combination. The induction heat cooking apparatus includes a resonance capacitor and a WPT capacitor, and wherein, (i) in a state in which the mode conversion switch is opened, the resonance capacitor is decoupled from the WPT capacitor and, (ii) in a state in which the mode conversion switch is closed, the resonance capacitor is coupled to the WPT capacitor. Detecting the type of the object comprises: detecting the type of the object that is located on the induction heat cooking apparatus. Detecting the type of the object comprises: receiving data about an operation mode of the induction heat cooking apparatus, and based on the data about the operation mode, determining that the object is an object to be heated or an object to receive wireless power. Determining that the object is an object to be heated or an object to receive wireless power comprises: based on the data indicating that the operation mode is a heating mode, determining that the object is an object for heating, and based on the data indicating that the operation mode is a wireless power transfer mode, determining that the object is an object for receiving wireless power.

In general, another innovative aspect of the subject matter described in this specification can be implemented in a system that includes an induction heat cooking apparatus and a secondary-side object, the induction heat cooking apparatus comprising: a rectifier that is configured to convert AC voltage supplied from an external power source into DC voltage; an inverter that is configured to generate current based on DC voltage received from the rectifier and provide the current to output nodes; heating coils that are configured to, based on the current generated by the inverter, generate magnetic fields; a first capacitive unit that includes one or more resonance capacitors and that is coupled between the output nodes; a second capacitive unit that includes one or more WPT capacitors and that is configured to be coupled between the output nodes; and a mode conversion switch that is configured to couple the second capacitive unit to the first capacitive unit in parallel, wherein, based on coupling between the first capacitive unit and the second capacitive unit, the secondary-side object receives heat or receives wireless power from the induction heat cooking apparatus.

The foregoing and other implementations can each optionally include one or more of the following features, alone or in combination. In particular, one implementation includes all the following features in combination. In the system, (i) in a state in which the first capacitive unit is coupled to the second capacitive unit, the secondary-side object is heated by the induction heat cooking apparatus, and (ii) in a state in which, the first capacitive unit is decoupled from the second capacitive unit, the secondary-side object receives wireless power from the induction heat cooking apparatus.

The details of one or more examples of the subject matter described in this specification are set forth in the accompanying drawings and the description below. Other potential features, aspects, and advantages of the subject matter will become apparent from the description, the drawings, and the claim.

BRIEF DESCRIPTION OF THE DRAWINGS

Like reference numbers and designations in the various drawings indicate like elements.

DETAILED DESCRIPTION

Description will now be given in detail according to exemplary implementations disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the implementations presented herein are not limited by the accompanying drawings. As such, the present disclosure should be construed to extend to any alterations, equivalents and substitutes in addition to those which are particularly set out in the accompanying drawings.

It will be understood that although the terms first, second, etc., may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Hereinafter, an induction heat cooking apparatus according to various implementations will be described in detail with reference to the accompanying drawings.

Figure 1:
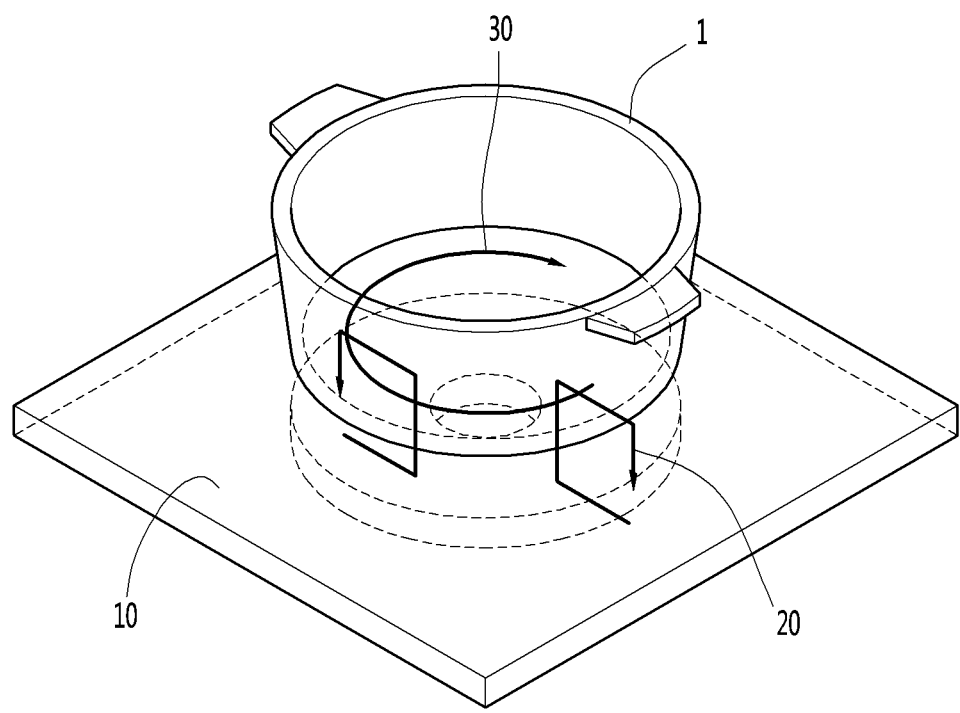
FIG. 1 is a diagram illustrating an example induction heat cooking apparatus.

FIG. 1 illustrates an example induction heat cooking apparatus.

Referring to FIG. 1, a cooking device 1 may be disposed on an induction heat cooking apparatus 10. The induction heat cooking apparatus 10 may heat the cooking device 1 disposed thereon.

Particularly, a method for heating the cooking device by using the induction heat cooking apparatus 10 will be described. The induction heat cooking apparatus 10 may generate magnetic fields 20. A portion of the magnetic fields 20 generated in the induction heat cooking apparatus 10 may pass through the cooking device 1.

Here, when an electric resistance component is contained in a material for forming the cooking device 1, the magnetic fields 20 may generate eddy current 30 in the cooking device 1. The eddy current 30 heats the cooking device 1 itself, and the heat is conducted to be transferred up to the inside of the cooking device 1. Thus, the induction heat cooking apparatus operates in a manner in which the contents of the cooking device 1 are cooked.

When the electric resistance component is not contained in the material for forming the cooking device 1, the eddy current 30 is not generated. Thus, in this case, the cooking device 1 is not heated. Thus, to heat the cooking device 1 by using the induction heat cooking apparatus 10, the cooking device 1 may be a stainless steel container or a metal container such as enamel or cast iron container.

Figure 2:
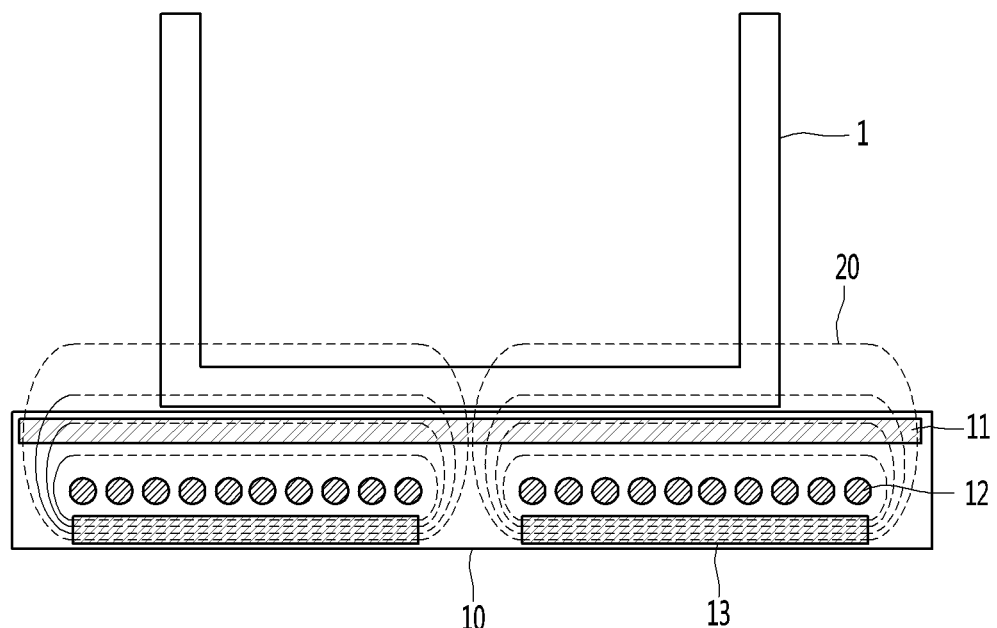
FIG. 2 is a diagram illustrating an example induction heat cooking apparatus.

FIG. 2 illustrates an example induction heat cooking apparatus. A method for generating the magnetic fields 20 by using the induction heat cooking apparatus 10 will be described with reference to FIG. 2.

As illustrated in FIG. 2, the induction heat cooking apparatus 10 may include at least one of an upper plate glass 11, a heating coil 12, and a ferrite 13.

First, each of components constituting the induction heat cooking apparatus 10 will be described in detail.

The upper plate glass 11 may protect the inside of the induction heat cooking apparatus 10 and support the cooking device 1.

Particularly, the upper plate glass 11 may be provided as a tempered glass made of a ceramic material that is synthesized with various minerals. Thus, the inside of the induction heat cooking apparatus 10 may be protected from the outside. Also, the upper plate glass 11 may support the cooking device 1 disposed thereon. Thus, the cooking device 1 may be disposed on an upper portion of the upper plate glass 11.

The heating coil 12 generates the magnetic fields 20 for heating the cooking device 1.

Particularly, the heating coil 12 may be disposed below the upper plate glass 11.

Current may flow or may not flow through the heating coil 12 according to power turn on/off of the induction heat cooking apparatus 10. Also, even when the current flows through the heating coil 12, an amount of current flowing through the heating coil 12 may vary according to firepower levels of the induction heat cooking apparatus 10.

When the current flows through the heating coil 12, the heating coil 12 may generate the magnetic fields 20. The more an amount of current flowing through the heating coil 12 increases, the more the intensity of the magnetic fields 20 may increase. The magnetic fields 20 generated in the heating coil 12 may pass through the cooking device 1. The magnetic fields 200 passing through the cooking device 1 may encounter the electrical resistance component contained in the cooking device 1 to generated eddy current. The eddy current may heat the cooking device 1 to cook the contents of the cooking device 1.

A flow direction of the magnetic fields 200 generated in the heating coil 12 may be determined by a direction of the current flowing through the heating coil 12. Thus, when AC current flows through the heating coil 12, the flow direction of the magnetic fields 20 may be converted by a frequency of the AC current. For example, when AC current of about 60 Hz flows through the heating coil 12, the flow direction of the magnetic fields 20 is converted about 60 times per second.

The ferrite 13 is a component for protecting an internal circuit of the induction heat cooking apparatus 10.

Particularly, the ferrite 13 serves as a shield for blocking an influence of the magnetic fields 20 generated in the heating coil 12 or electromagnetic fields generated from the outside on the internal circuit of the induction heat cooking apparatus 10.

For this, the ferrite 13 may be made of a material having high permeability. The ferrite 13 may induce the magnetic fields introduced into the induction heat cooking apparatus 10 to flow through the ferrite 13 without being radiated. A state in which the magnetic fields 20 generated in the heating coil 12 moves by the ferrite 13 is illustrated in FIG. 2.

Figure 3:
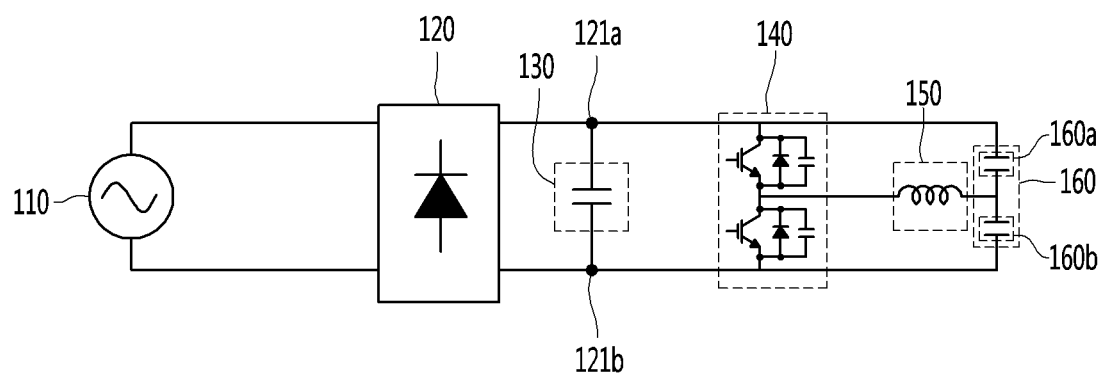
FIG. 3 is a diagram illustrating an example circuit of an induction heat cooking apparatus.

FIG. 3 illustrates an example circuit of an induction heat cooking apparatus. In particular, FIG. 3 is a circuit diagram of the induction heat cooking apparatus including one inverter and one heating coil.

Referring to FIG. 3, the induction heat cooking apparatus includes a rectifier 120, a DC link capacitor 130, an inverter 140, a heating coil 150, and a resonance capacitive unit 160.

An external power source 110 may be an AC input power source. The external power source 110 may supply AC power to the induction heat cooking apparatus. In more detail, the external power source 110 may supply the AC power to the rectifier 120 of the induction heat cooking apparatus.

The rectifier 120 is an electrical device for converting AC power into DC power.

The rectifier 120 converts an AC voltage supplied through the external power source 110 into a DC voltage.

Both DC nodes 121a and 121b of the rectifier 120, through which the DC voltage is outputted, may be called DC links. A voltage measured at each of both the DC nodes 121a and 121b is referred to as a DC link voltage. When resonance curves are the same, output power may vary according to the DC link voltage.

The DC link capacitor 130 serve as a buffer between the external power source 110 and the inverter 140. Particularly, the DC link capacitor 130 may be used to maintain the DC link voltage converted through the rectifier 120 and supply the DC link voltage up to the inverter 140.

The inverter 140 serves as a switch for switching the voltage applied to the heating coil 150 so that high-frequency current flows through the heating coil 150. The inverter 140 drives a switching device, which is generally provided as an insulated gate bipolar transistor (IGBT), to allow the high-frequency current to flow through the heating coil 150, thereby generating high-frequency magnetic fields in the heating coil 150.

The current may flow or may not flow through the heating coil 150 according to whether the switching device is driven. When the current flows through the heating coil 150, the magnetic fields are generated. The heating coil 150 may generate the magnetic fields due to the flowing of the current to heat the cooking device.

As described above, the induction heat cooking apparatus may heat the cooking device by using electromagnetic induction of the heating coil 150.

The heating coil 150 used for heating the cooking device is intended to be used for wireless power transfer (WPT).

First, the wireless power transfer will be described. The wireless power transfer means a technology for transferring power. As present, there are a magnetic induction (MI) manner and a magnetic resonance (MR) manner as manners mainly utilized for the wireless power transfer. Each of the manners will be particularly described.

The magnetic induction manner uses a magnetic induction phenomenon between a primary coil and a secondary coil. Particularly, when current is introduced into the primary (transmission) coil, magnetic fields may be generated. The secondary (receiving) coil generates induced current by the magnetic fields generated in the primary coil. The induced current generated in the secondary coil may charge a battery. Since the magnetic fields generated in the magnetic induction manner are weak, the primary coil and the secondary coil have to be disposed in very close to each other so as to charge the battery.

A charging principle using the magnetic resonance manner will be described. This is a manner for receiving and transferring power by using the same frequency of the primary coil and the secondary coil. That is, when magnetic fields that oscillate at the resonance frequency in the primary coil, the secondary coil may be designed to resonate at the same resonance frequency as the magnetic fields generated in the primary coil to receive energy. In this case, the charging may be performed at a relatively long distance. As described above, the coil is used for the wireless power transfer. In the present disclosure, the heating coil 150 used for heating the cooking device may be intended to be used for the wireless power transfer. This will be described later in detail.

Referring again to FIG. 3, the heating coil 150 has one side connected to a connection point of the switching device of the inverter 140 and the other side connected to the resonance capacitive unit 160.

The driving of the switching device may be performed by a driving unit. A high-frequency voltage may be applied to the heating coil 150 while the switching devices alternately operate under the control of a switching time outputted from the driving unit. Also, since the turn on/off time of the switching device, which is applied from the driving unit, is controlled to be gradually compensated, the voltage supplied to the heating coil 150 may be converted from a low voltage into a high voltage.

The driving unit may control an overall operation of the induction heat cooking apparatus. That is, the driving unit may control an operation of each of the components constituting the induction heat cooking apparatus.

The resonance capacitive unit 160 is a component that serves as a buffer. The resonance capacitive unit 160 may adjust a saturation voltage rising ratio during the turn-off of the switching device to affect energy loss during the turn-off time.

The resonance capacitive unit 160 may include a plurality of capacitors 16a and 160b connected to each other. The resonance capacitive unit 160 may by connected to the DC nodes 121a and 121b through which power is outputted from the rectifier 120 and the heating coil 150.

The resonance capacitive unit 160 may include a first resonance capacitor 160a and a second resonance capacitor 160b. Particularly, the first resonance capacitor 160a has one end connected to one end 121a through which a voltage is outputted from the rectifier 120 and the other end connected to a connection point between the second resonance capacitor 160b and the heating coil 150. Similarly, the second resonance capacitor 160b has one end connected to one end 121a through which a voltage is outputted from the rectifier 120 and the other end connected to a connection point between the second resonance capacitor 160b and the heating coil 150.

The first resonance capacitor 160a has the same capacitance as the second resonance capacitor 160b.

A resonance frequency of the induction heat cooking apparatus may be determined by the capacitance of the resonance capacitive unit 160.

Particularly, a resonance frequency of the induction heat cooking apparatus, which has the circuit diagram as illustrated in FIG. 3, is determined by inductance of the heating coil 150 and capacitance of the resonance capacitive unit 160.

Also, a resonance curve may be formed based on the resonance frequency determined by the inductance of the heating coil 150 and the capacitance of the resonance capacitive unit 160. The resonance curve may represent output power according to the frequency.

Figure 4:
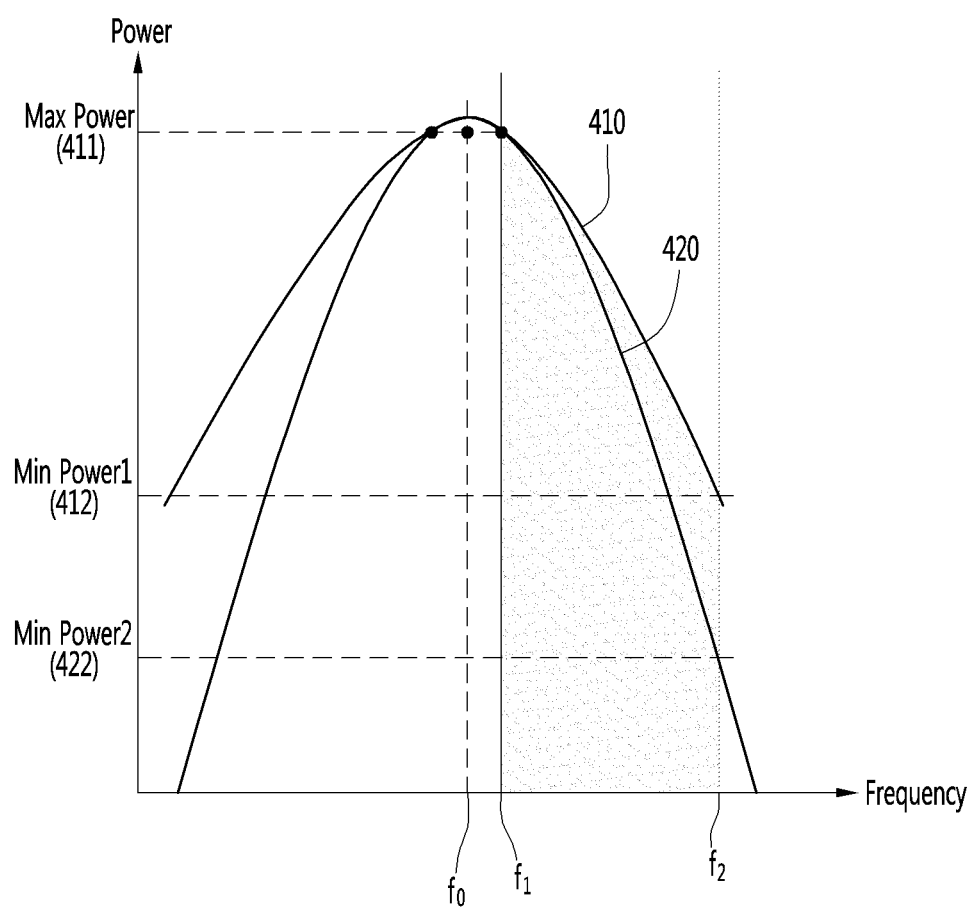
FIG. 4 is a diagram illustrating an example graph between output power and a frequency of an induction heat cooking apparatus.

FIG. 4 illustrates an example graph between output power and a frequency of an induction heat cooking apparatus.

A quality (Q) factor may be determined according to the inductance value of the heating coil 150 and the capacitance value of the resonance capacitive unit 160, which are provided in the induction heat cooking apparatus. The resonance curves are different from each other. For example, referring to FIG. 4, a first resonance curve 410 and a second resonance curve 420 are resonance curves formed by Q factors different from each other. Thus, the induction heat cooking apparatus may have output characteristics different from each other according to the inductance of the heating coil 150 and the capacitance of the resonance capacitive unit 160.

Particularly, the resonance curve according to the Q factor will be described with reference to FIG. 4. In general, the more the Q factor is large, the more the curve has a sharp shape. The more the Q factor is small, the more the curve has a broad shape. Thus, the Q factor of the first resonance curve 410 is less than that of the second resonance curve 420.

In the first and second resonance curves 410 and 420 of FIG. 4, a horizontal axis represents a frequency, and a vertical axis represents outputted power. In the first and second resonance curves 410 and 420, a frequency at which maximum power is outputted is called a resonance frequency $f_0$.

In general, the induction heat cooking apparatus uses a frequency in a right region with respect to the resonance frequency $f_0$ of the resonance curve. Thus, the induction heat cooking apparatus may decrease the frequency to increase a firepower level and may increase the frequency to decrease the firepower level. That is, the induction heat cooking apparatus may change the frequency into one frequency between a first frequency $f_1$ to a second frequency $f_2$ to adjust the output power.

The first frequency $f_1$ that is a minimum frequency controllable by the induction heat cooking apparatus and the second frequency $f_2$ that is a maximum frequency controllable by the induction heat cooking apparatus may be previously set. For example, the first frequency $f_1$ may be about 20 kHz, and the second frequency $f_2$ may be about 75 kHz.

As the first frequency $f_1$ is set to about 20 kHz, a case in which the induction heat cooking apparatus uses an audible frequency (about 16 Hz to about 20 kHz) may be prevented from occurring. Thus, there is an effect in which noises of the induction heat cooking apparatus are reduced.

The second frequency $f_2$ may be set to an IGBT maximum switching frequency. The IGBT maximum switching frequency may represent an operable maximum frequency in consideration of an internal pressure and capacity of the IGBT switching device. For example, the IGBT maximum switching frequency may be about 75 kHz.

For this reason, the frequency that is generally used for heating the cooking device by the induction heat cooking apparatus may be a frequency ranging from about 20 kHz to about 75 kHz.

The frequency used for the wireless power transfer (WPT) may be different from that used for heating the cooking device by the induction heat cooking apparatus. Particularly, the frequency used for the WPT may be a frequency having a baseband greater than that of the frequency used for heating the cooking device by the induction heat cooking apparatus.

Thus, the induction heat cooking apparatus may adjust the resonance frequency to provide all the functions of heating the cooking device through the heating coil 150 and wirelessly transferring the power.

Figure 5A:
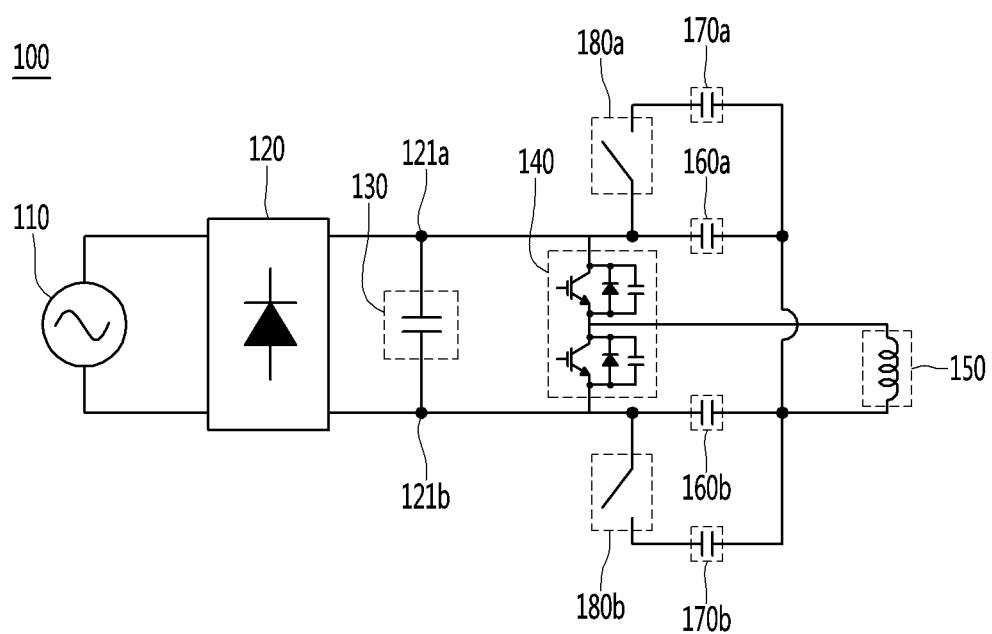
FIGS. 5A to 6 are diagrams illustrating example circuits for an induction heat cooking apparatus.
Figure 5B:
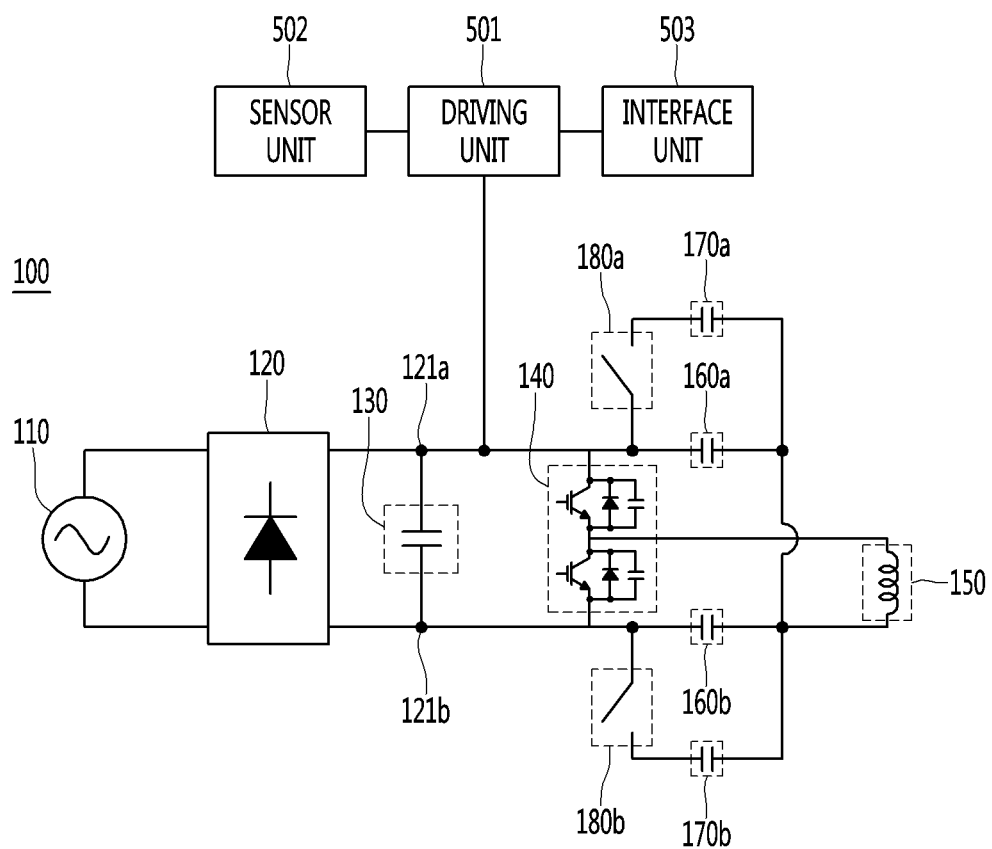

FIGS. 5A and 5B illustrate example circuits for an induction heat cooking apparatus. FIG. 5A is a circuit diagram of the induction heat cooking apparatus, which provides the cooking device heating function and the WPT function.

Referring to FIG. 5A, an induction heat cooking apparatus 100 may include a rectifier 120, a DC link capacitor 130, an inverter 140, a heating coil 150, resonance capacitive units 160a and 160b, WPT capacitors 170a and 170b, and mode conversion switches 180a and 180b.

The same contents as those described with reference to FIG. 3 will be omitted.

The heating coil 150 generates magnetic fields due to a flow of current. The magnetic fields generated in the heating coil 150 may pass through a secondary-side object to heat the secondary-side object. Alternatively, the magnetic fields generated in the heating coil 150 may pass through the secondary-side object to transfer power to the secondary-side object.

The resonance capacitive units 160a and 160b are the same as those of FIG. 3. That is, the resonance capacitive units 160a and 160b of FIG. 5A are the same as the resonance capacitive unit provided in the induction heat cooking apparatus described with respect to FIG. 3 according to the related art.

The resonance capacitive units 160a and 160b may operate in a wireless power transfer mode or a cooking device heating mode and thus may be connected in parallel to WPT capacitors 170a and 170b or may not be connected in parallel to the WPT capacitors 170a and 170b.

The WPT capacitors 170a and 170b may be connected in parallel to the resonance capacitive units 160a and 160b. The WPT capacitors 170a and 170b may be components for reducing a resonance frequency for the wireless power transfer so that the induction heat cooking apparatus 100 operates in the wireless power transfer mode.

Particularly, when the induction heat cooking apparatus 100 operates in the cooking device heating mode, the WPT capacitors 170a and 170b may not be connected to the resonance capacitive units 160a and 160b.

On the other hand, when the induction heat cooking apparatus 100 operates in the wireless power transfer mode, the WPT capacitors 170a and 170b are connected in parallel to the resonance capacitive units 160a and 160b. When the WPT capacitors 170a and 170b and the resonance capacitive units 160a and 160b are connected in parallel to each other, synthetic capacitance increases. When synthetic capacitance increases, the resonance frequency $f_0$ is reduced by following Equation 1.

$$f_0 = \frac{1}{2\pi\sqrt{LC}} \qquad \text{[Equation 1]}$$

That is, when the induction heat cooking apparatus 100 operates in the wireless power transfer mode, the resonance frequency $f_0$ is reduced. As described above, the induction heat cooking apparatus 100 may reduce the resonance frequency $f_0$ to wirelessly transfer power to the secondary-side object by using the inverter 140 and the heating coil 150.

The WPT capacitors 170a and 170b includes a first WPT capacitor 170a and a second WPT capacitor 170b. The first WPT capacitor 170a may be connected in parallel to the first resonance capacitor 160a, and the second WPT capacitor 170b may be connected in parallel to the second resonance capacitor 160b.

The first WPT capacitor 170a has the same capacitance as the second WPT capacitor 170b.

The mode conversion switches 180a and 180b may determine whether to connect the WPT capacitors 170a and 170b to the resonance capacitive units 160a and 160b in parallel. That is, the mode conversion switches 180a and 180b may control the WPT capacitors 170a and 170b so that the WPT capacitors 170a and 170b are connected or not connected to the resonance capacitive units 160a and 160b.

Particularly, when the mode conversion switches 180a and 180b are turned on, a circuit is shorted to allow the WPT capacitors 170a and 170b to be connected in parallel to the resonance capacitive units 160a and 160b. Thus, as described above, the resonance frequency $f_0$ is reduced.

On the other hand, when the mode conversion switches 180a and 180b are turned off, the circuit is opened, and thus, the WPT capacitors 170a and 170b are not connected to the resonance capacitive units 160a and 160b. Thus, the resonance frequency $f_0$ is not changed.

The mode conversion switches 180a and 180b includes a first mode conversion switch 180a and a second mode conversion switch 180b. The first mode conversion switch 180a and the second mode conversion switch 180b operate at the same time. The first mode conversion switch 180a may determine whether to connect the first WPT capacitor 170a to the first resonance capacitor 160a in parallel, and the second mode conversion switch 180b may determine whether to connect the second WPT capacitor 170b to the second resonance capacitor 160b in parallel.

As described above, the mode conversion switches 180a and 180b may be controlled according to the operation modes to operate in the wireless power transfer mode or in the cooking device heating mode through the same heating coil 150.

A driving unit 501 for controlling the mode conversion switches 180a and 180b, a sensing unit 502 for determining the operation mode, and an interface unit 503 will be described with reference to FIG. 5B.

The driving unit 501 may control a closed/opened state of each of the mode conversion switches 180a and 180b. Particularly, the driving unit 501 may control the mode conversion switches 180a and 180b so that the mode conversion switches 180a and 180b are closed or opened according to a signal received from the sensing unit 502 or the interface unit 503.

The sensing unit 502 may recognize a kind of object disposed on the induction heat cooking apparatus. When the detected object is an object for heating, the driving unit 501 may control the mode conversion switches 180a and 180b so that each of the mode conversion switches 180a and 180b are opened. When the detected object is an object for receiving wireless power, the driving unit 501 may control the mode conversion switches 180a and 180b so that each of the mode conversion switches 180a and 180b are closed.

The interface unit 503 may receive the operation mode of the induction heat cooking apparatus 100. That is, the interface unit 503 may receive an operation mode selection command so that the induction heat cooking apparatus 100 operates in the cooking device heating mode or the wireless power transfer mode through a user's input. When the received operation mode is the cooking device heating mode, the driving unit 501 controls the mode conversion switches 180a and 180b so that each of the mode conversion switches 180a and 180b are opened. When the received operation mode is the wireless power transfer mode, the driving unit 501 may control the mode conversion switches 180a and 180b so that each of the mode conversion switches 180a and 180b are closed.

This will be described in detail with reference to FIG. 11.

In case of operating in the cooking device heating mode, the resonance frequency is determined by capacitance of the resonance capacitive units 160a and 160b and inductance of the heating coil 150.

On the other hand, in case of operating in the wireless power transfer mode, the resonance frequency is determined by synthetic capacitance and leakage inductance of the resonance capacitive units 160a and 160b and the WPT capacitors 170a and 170b.

Figure 6:
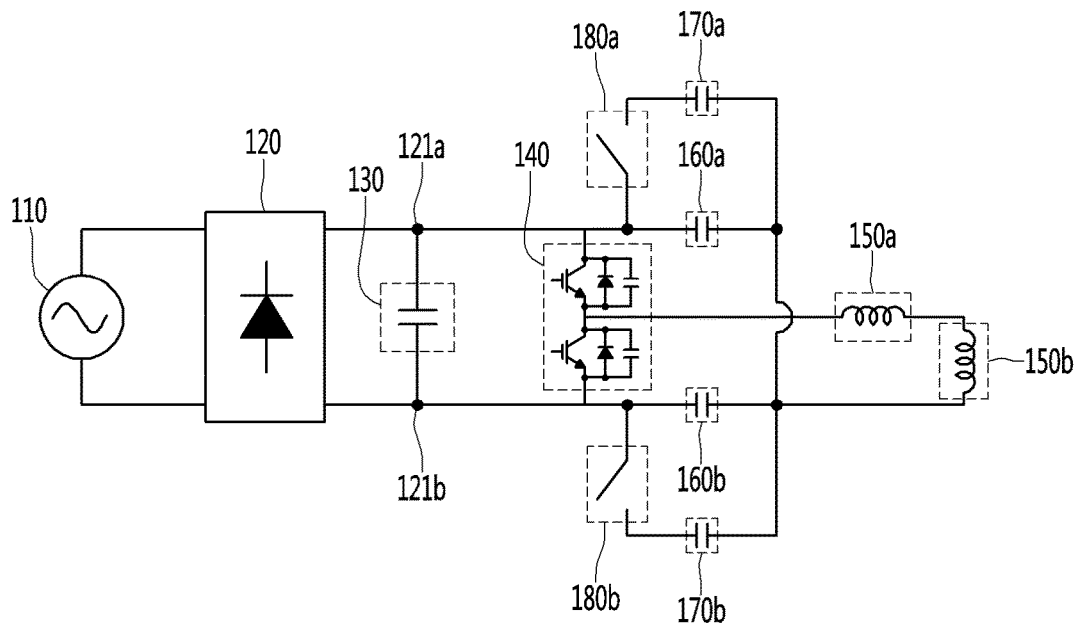

FIG. 6 illustrates an example circuit for an induction heat cooking apparatus. The leakage inductance for acquiring the resonance frequency according to the wireless power transfer mode will be described with reference to FIG. 6.

Referring to FIG. 6, the heating coil 150 is divided into a leaking coil 150a and a magnetizing coil 150b. That is, the heating coil 150 of the induction heat cooking apparatus 100 may be divided into a leaking portion and a magnetizing portion. Synthetic inductance of the leaking coil 150a and the magnetizing coil 150b are the same as that of the heating coil 150.

The leaking coil 150a may be a remaining portion which is not coupled to the secondary-side coil. That is, the leaking coil 150a represents a portion of the heating coil 150, which does not transfer power to the secondary-side coil. The magnetizing coil 150b is a portion that is coupled to the secondary-side coil. That is, the magnetizing coil 150b represents a portion of the heating coil 150, which transfers power to the secondary-side coil.

Here, the resonance frequency according to the wireless power transfer mode is determined by the inductance of the leaking coil 150a. In more detail, the resonance frequency is determined according to the wireless power transfer mode through the inductance of the leaking coil 150a and the synthetic capacitance of the resonance capacitive units 160a and 160b and the WPT capacitors 170a and 170b.

Figure 7:
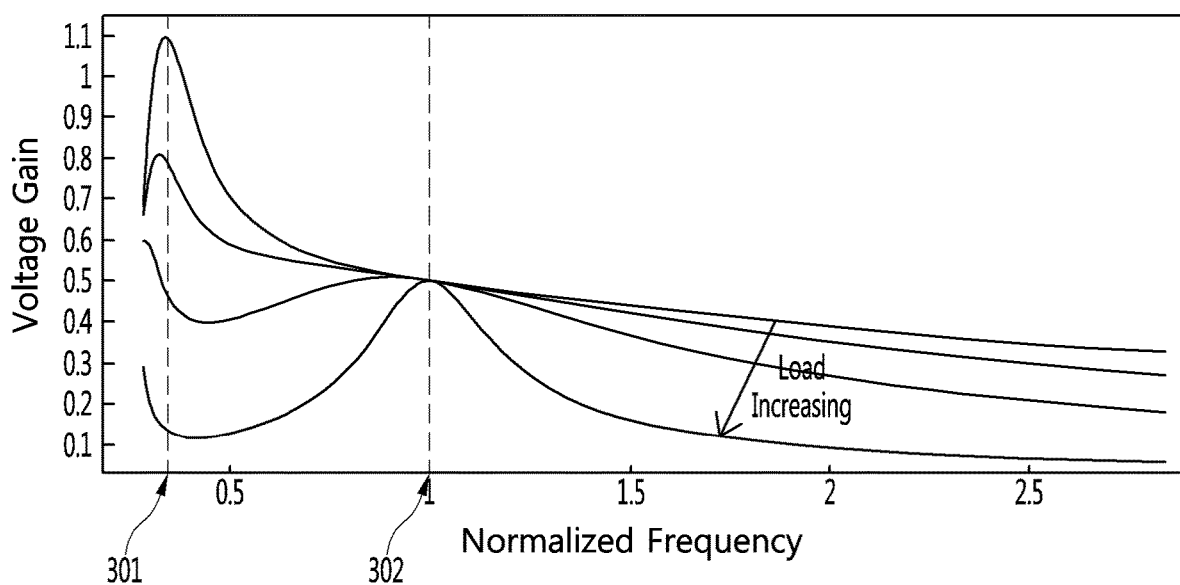
FIG. 7 is a diagram illustrating an example graph between a voltage gain and a frequency of an induction heat cooking apparatus.

FIG. 7 illustrates an example graph between a voltage gain and a frequency of an induction heat cooking apparatus. A method for determining the operation frequency when the induction heat cooking apparatus operates in the wireless power transfer mode will be described with reference to FIG. 7.

In a plurality of curves of FIG. 7, an x-axis represents a frequency, and a y-axis represents a voltage gain. Particularly, an x-axis represents a normalized frequency on the basis of the resonance frequency in the wireless power transfer mode. A y-axis represents a voltage gain that corresponds to a secondary-side voltage to a primary-side voltage.

Referring to shapes of the plurality of curves of FIG. 7, it is seen that the voltage gain curve is changed in shape as a load varies. Particularly, as the load increases, the voltage gain curve is changed in a shape in which a voltage gain decreases.

An operation frequency 301 according to the cooking device heating mode is determined as a frequency that corresponds to the highest voltage gain. In case of operating in the cooking device heating mode, the induction heat cooking apparatus operates at the frequency at which the largest voltage gain is obtained without varying in load.

On the other hand, an operation frequency 302 according to the wireless power transfer mode is determined as a frequency having a constant voltage gain regardless of a vibration in load. This is done for applying a contact voltage even though the load varies because a load of the secondary-side object receiving power according to the wireless power transfer mode varies. Thus, in case of operating in the wireless power transfer mode, a constant voltage may be transferred to the secondary side regardless of the variation in load.

The operation frequency 301 according to the cooking device hating mode has a voltage gain that varies according to the variation in load, but the operation frequency 302 according to the wireless power transfer mode has a constant voltage gain even though the load varies. For example, the voltage gain at the operation frequency 302 according to the wireless power transfer mode may be constant to about 0.5. In this case, when the primary-side induction heat cooking apparatus transfers a voltage of about 100 V, the secondary-side object may output a voltage of about 50 V.

A diagram of a secondary-side circuit receiving wireless power from the induction heat cooking apparatus will be described with reference to FIGS. 8 to 10. The secondary-side circuit diagram may represent a circuit diagram of the wireless power receiving device receiving wireless power from the induction heat cooking apparatus 100.

Figure 8:
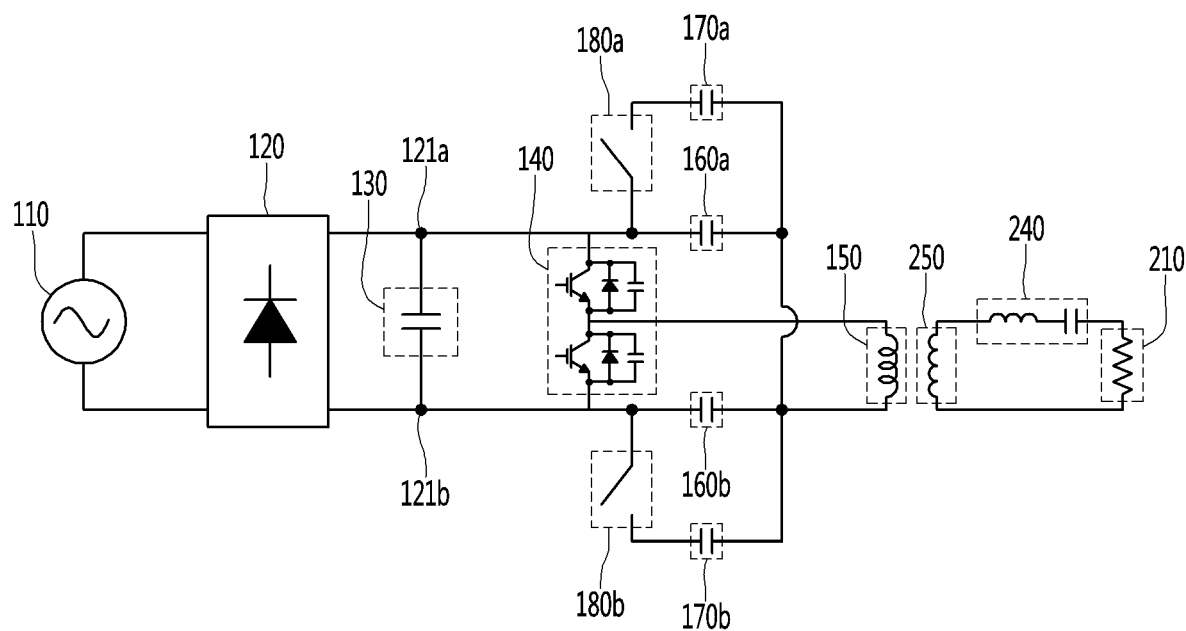
FIG. 8 is a diagram illustrating an example circuit of an induction heat cooking apparatus.

FIG. 8 illustrates an example circuit of an induction heat cooking apparatus. In particular, FIG. 8 is a circuit diagram for receiving wireless power from the induction heat cooking apparatus when a secondary-side load is a fixed load. The fixed load may represent a load that is driven in a state in which a resistance value is fixed.

Particularly, a secondary-side receiving coil 250 may receive wireless power from the primary-side heating coil 150. The primary side is the same as the above-described primary side.

A secondary-side object may include a receiving coil 250, a resonance circuit 240, and a fixed load 210.

According to an implementation, the receiving coil 250 may receive the magnetic fields generated in the heating coil 150. Particularly, the receiving coil 250 may be designed to resonate at the same resonance frequency as that generated in the heating coil 150. Thus, the receiving coil 250 may receive power from the magnetic fields generated in the heating coil 150.

The receiving coil 250 receives AC power from the heating coil 150. The AC power received into the receiving coil 250 passes through the resonance circuit 240 and then is transferred to the fixed load 210.

The fixed load 210 may be driven by using the received AC power.

Examples of the secondary-side object including the fixed load 210 may include a zaigle, a heater, and the like. That is, an electric heater such as the zaigle, the heater, and the like may receive wireless power from the induction heat cooking apparatus and be driven.

In case in which the secondary side that is a variable load instead of the fixed load having the circuit diagram as illustrated in FIG. 8, it is difficult to control an output due to a variation in output voltage (ripple voltage). To solve this limitation, the secondary-side circuit diagram may further include a power factor correction (PFC) power converter.

Figure 9:
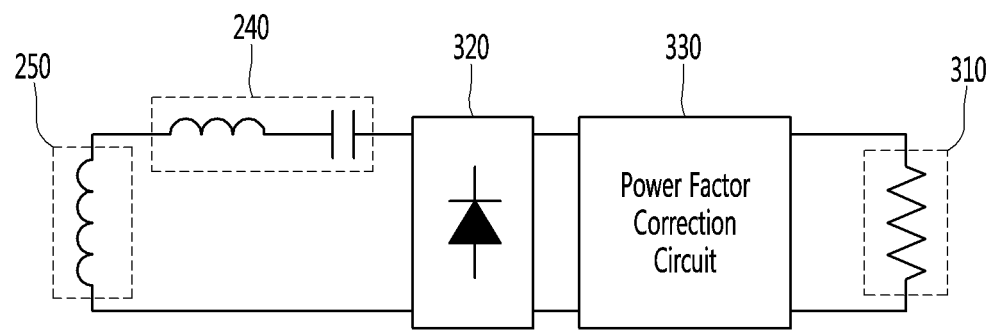
FIG. 9 is a diagram illustrating an example circuit to receive wireless power from an induction heat cooking apparatus.

FIG. 9 illustrates an example circuit to receive wireless power from an induction heat cooking apparatus. In particular, FIG. 9 is a circuit diagram for receiving the wireless power from the induction heat cooking apparatus when the secondary-side load is a variable load.

Referring to FIG. 9, the secondary-side object may include a receiving coil 250, a resonance circuit 240, a secondary rectifier 320, a PFC circuit 330, and a variable load 310. The variable load 310 may represent a load that is driven in a state in which a resistance value is not fixed.

Also, the variable load 310 may be called a PFC power converter including a secondary rectifier 320 and a PFC circuit 330.

The receiving coil 250 and the resonance circuit 240 are the same as those of FIG. 8. That is, the receiving coil 250 receives AC power from the heating coil 250, and the resonance circuit 240 transfers the AC power to the secondary rectifier 320. The secondary rectifier 320 performs the same function as the rectifier 120 of the primary-side circuit diagram, which is described with reference to FIG. 3, but the name is different only to be distinguished.

The secondary rectifier 320 rectifies the transferred AC voltage into a DC voltage. The DC voltage that is rectified by the secondary rectifier 320 passes through the PFC circuit 330 and is transferred to the variable load 310.

Here, the PFC circuit 330 may be a device for improving a power factor by minimizing reactive power transferred from the primary side.

Also, the PFC circuit 330 may be a component for driving the variable load. The PFC circuit 330 may output a fixed voltage by using a waveform that is rectified by the secondary rectifier 320. Particularly, the PFC circuit 330 supplies the fixed output voltage to convert the variable load 310 into the fixed load. This process may be called a power stage.

Figure 10:
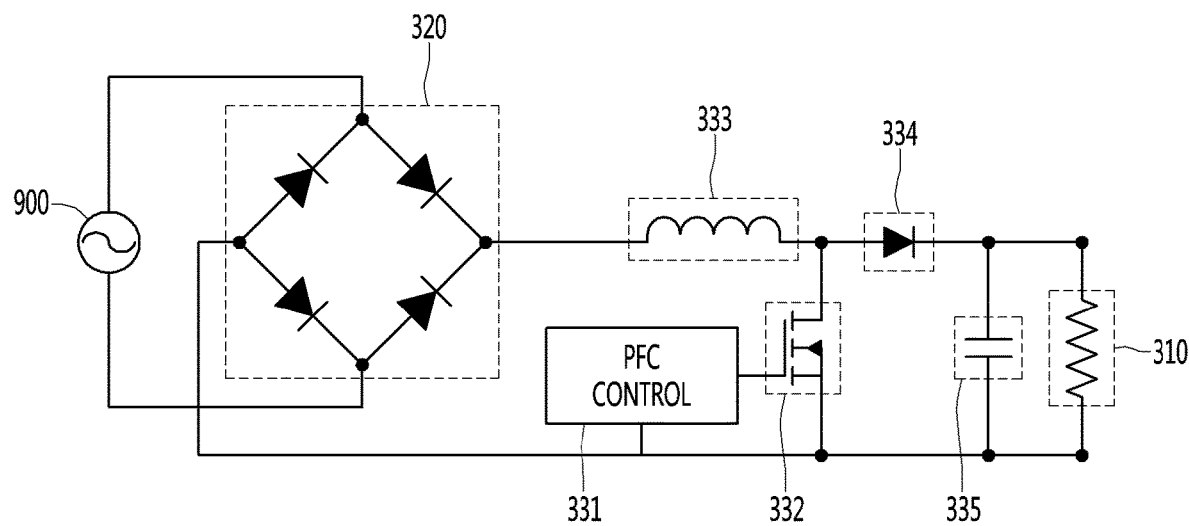
FIG. 10 is a diagram illustrating an example circuit of a PFC power converter.

FIG. 10 illustrates an example circuit of a PFC power converter. A function of the PFC circuit 330 will be specifically described with reference to FIG. 10.

The PFC power converter includes a secondary rectifier 320 and a PFC circuit 330.

Input power 900 represents AC power received through the receiving coil 250 to pass through the resonance circuit 240. The input power 900 is supplied to the PFC power converter.

Hereinafter, the PFC power converter will be particularly described.

The secondary rectifier 320 rectifies the input power 900 into DC power. The secondary rectifier 320 may have the form of a diode bridge. For example, the diode bridge may have the form of a full-bridge constituted by SBR30300CTFP.

The PFC circuit 330 may include a PFC controller 331, a FET switch 332, an inductor 333, a diode 334, and an output capacitor 335.

Hereinafter, an operation principle of the PFC circuit 330 will be described.

The inductor 333 receives an input voltage from the secondary rectifier 320.

The PFC controller 331 may control an operation of the FET switch 332. Particularly, the PFC controller 331 may control the FET switch 332 to turn on or off the FET switch 332.

When the FET switch 332 is turned on, current passing through the inductor 333 flows to the FET switch 332 to charge the inductor 333 with the current. In this case, the diode 334 may prevent the current charged into the output capacitor 335 from flowing backward.

When the FET switch 332 is turned off, the current charged in the inductor 333 is discharged to generate a voltage higher than the input voltage. That is, a voltage higher than the input voltage is applied to the output capacitor 335 through the above-described process. The output capacitor 335 absorbs a high frequency.

Thus, the PFC circuit 330 may output the voltage so that a current phase is equal to a phase of a linear load according to a voltage phase even though the high frequency is generated. That is, a DC output voltage that is rectified by the PFC circuit 330 may be obtained.

For example, the inductor 333 has inductance of about 220 uH, and the output capacitor 335 has capacitance of about 800 uF. In this case, the PFC power converter may constantly output a DC voltage of about 180 Vdc when the power inputted through the secondary rectifier 320 is about 80 Vdc/60 kHz to about 120 Vdc/60 kHz.

As described above, a power factor of the secondary side may be improved through the PFC power converter. Also, although the secondary side includes the variable load, the secondary side may stably operate.

Also, since the PFC power converter includes the secondary side, power capacity may be reduced. In more detail, when the primary side includes the PFC power converter, an imaginary part of the input impedance may increase by the output capacitance 335, and thus, the primary side and the entirety very increase in power capacity. On the other hand, when the secondary side includes the PFC power converter, the secondary side and the entirety may be relatively reduced in power capacity.

Exemplary examples of the secondary-side object including the variable load 310 may include a device including a motor such as a mixer. That is, the device including the rotational load such as the motor may receive wireless power from the induction heat cooking apparatus and be driven.

Figure 11:
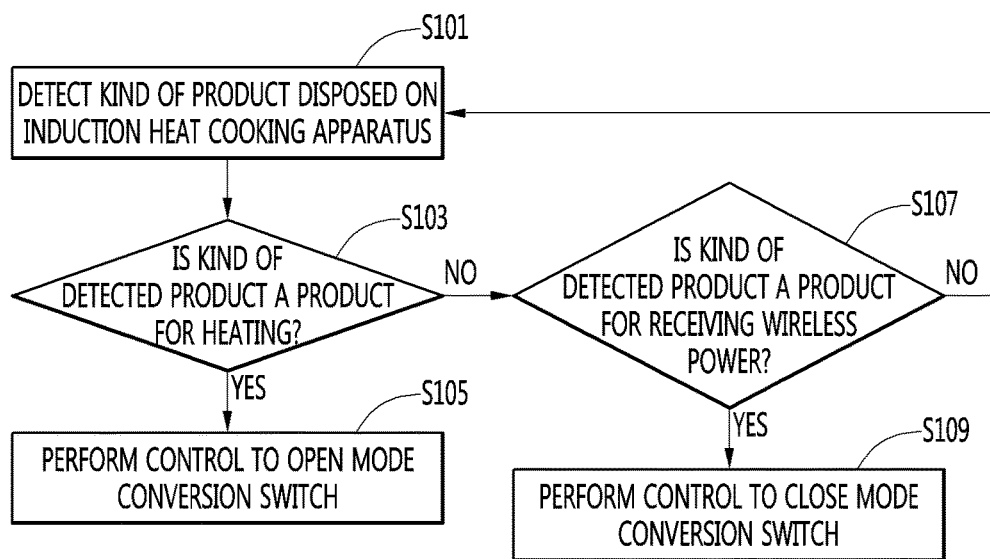
FIG. 11 is a flowchart illustrating an example method to operate an induction heat cooking apparatus.

FIG. 11 is a flowchart illustrating an example method to operate an induction heat cooking apparatus.

A driving unit 501 may detect a kind of object disposed on the induction heat cooking apparatus (S101).

According to a first implementation, the induction heat cooking apparatus 100 may further include a sensing unit 502. The sensing unit 502 may detect a kind of object disposed on the induction heat cooking apparatus 100 to transmit the detected information to the driving unit 501. That is, the sensing unit 502 may detect whether the object disposed on the induction heat cooking apparatus 100 is an object for heating or an object for receiving wireless power to transmit the detected information to the driving unit 501.

Alternatively, according to a second implementation, the interface unit 503 of the induction heat cooking apparatus 100 may receive object-type information. Particularly, a user may input an operation mode through the interface unit 503 to allow the induction heat cooking apparatus 100 to operate in a cooking device heating mode or a wireless power transfer mode.

The interface unit 503 transmits the received operation mode to the driving unit 502. The driving unit 502 may detect the object disposed on the induction heat cooking apparatus 100 as the object for the heating when the received operation mode is an operation command for the cooking device heating mode. On the other hand, the driving unit 502 may detect the object disposed on the induction heat cooking apparatus 100 as the object for receiving the wireless power when the received operation mode is an operation command for the wireless power transfer mode.

The driving unit 502 of the induction heat cooking apparatus 100 may control mode conversion switches 180a and 180b so that the mode conversion switches 180a and 180b are opened (S105) when the detected object is the object for the heating (S103).

An operation method of the induction heat cooking apparatus 100 in case of the object for the heating will be described with reference to FIGS. 5A and 12.

Referring to the above-described circuit diagram of FIG. 5A, the mode conversion switches 180a and 180b are opened. Thus, the resonance capacitive units 160a and 160b operate in a state in which the resonance capacitive units 160a and 160b are not connected to the WPT capacitors 170a and 170b.

Thus, the rectifier 120 receives external power to output the received power to both DC nodes 121, and the inverter 140 supplies current to the heating coil 150 through the DC link capacitor. The resultant operation will be described in detail with reference to FIG. 12.

Figure 12:
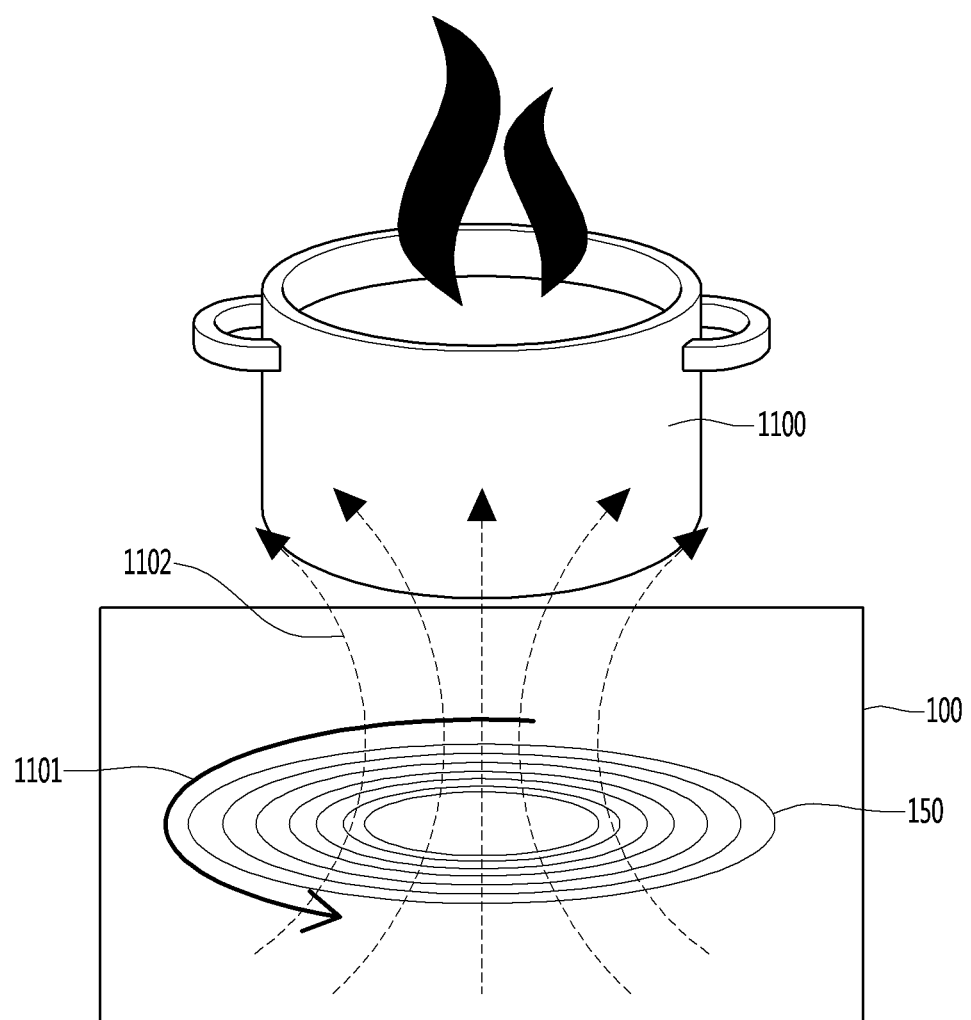
FIG. 12 is a diagram illustrating an example induction heat cooking apparatus heating an object.

FIG. 12 illustrates an example induction heat cooking apparatus heating an object.

Current 1101 supplied by the inverter 140 flows through the heating coil 150 of the induction heat cooking apparatus 100. The current generates magnetic fields 1102, and the generated magnetic fields 1102 may pass through a cooking device 1100. The magnetic fields passing through the cooking device 1100 generates eddy current in the cooking device 1100 to heat the cooking device 1100.

Referring back to FIG. 11, the driving unit 502 of the induction heat cooking apparatus 100 determines the object as the object for receiving the wireless power (S107) when the detected object is not the object for the heating (S103).

The driving unit 502 of the induction heat cooking apparatus 100 controls the mode conversion switches 180a and 180b so that the mode conversion switches 180a and 180b are closed (S109) when the detected object is the object for receiving the wireless power (S107).

Figure 13:
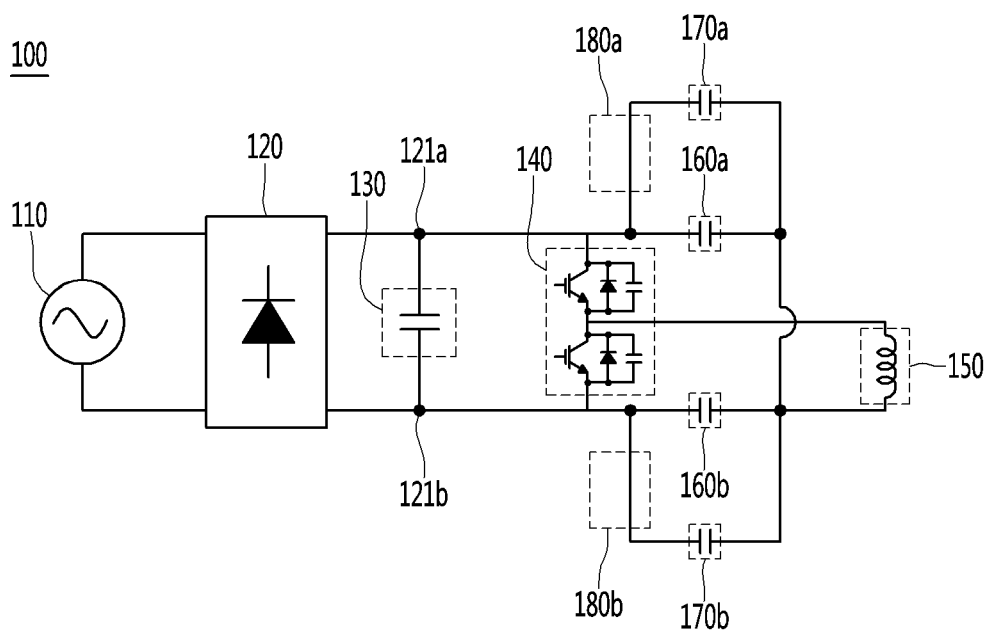
FIGS. 13 and 14 are diagrams illustrating example operations of an induction heat cooking apparatus.
Figure 14:
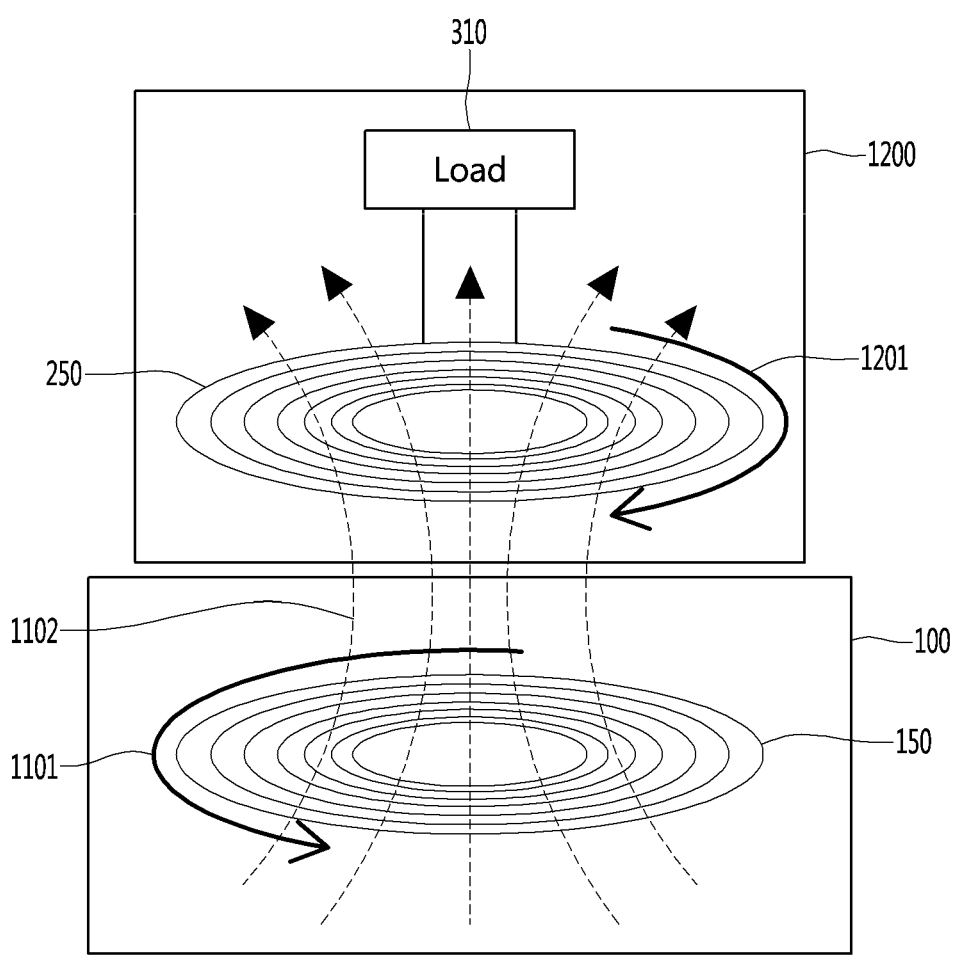

FIGS. 13 and 14 illustrate example operations of an induction heat cooking apparatus. In more detail, FIG. 13 is a circuit diagram illustrating an operation of the induction heat cooking apparatus when the object for receiving the wireless power is disposed, and FIG. 14 is a view illustrating an operation of the induction heat cooking apparatus when the object for receiving the wireless power is disposed.

As illustrated in FIG. 13, when the detected object is the object for receiving the wireless power, the mode conversion switches 180a and 180b are closed. Thus, the resonance capacitive units 160a and 160b and the WPT capacitors 170a and 170b operate in a state of being connected in parallel to each other. Since the resonance capacitive units 160a and 160b and the WPT capacitors 170a and 170b are connected in parallel to each other, synthetic capacitance increases, and thus, a resonance frequency decreases as the synthetic capacitance increases.

Thus, the wireless power may be transferred to the secondary side (an object disposed on an upper plate glass 11) by using the heating coil 150. The resultant operation will be described in detail with reference to FIG. 14.

The heating coil 150 of the induction heat cooking apparatus 100 may generate the magnetic fields 1102 due to the flow of the current 1101 through the heating coil 150. The magnetic fields 1102 may pass through the object 1200 for receiving the wireless power. Here, the receiving coil 250 of the object 1200 for receiving the wireless power receives the magnetic fields 1102 to generate current 1201. The current 1201 generated in the object 1200 for receiving the wireless power applies a voltage to a load 310 to drive the load 310. The load 310 may be the fixed load 210 of FIG. 8 or the variable load 310 of FIG. 9.

As described above, the induction heat cooking apparatus 100 may detect a kind of object to heat the object or transfer the wireless power to the object. That is, the induction heat cooking apparatus 100 may heat the object or transfer the wireless power to the object as necessary.

Figure 15:
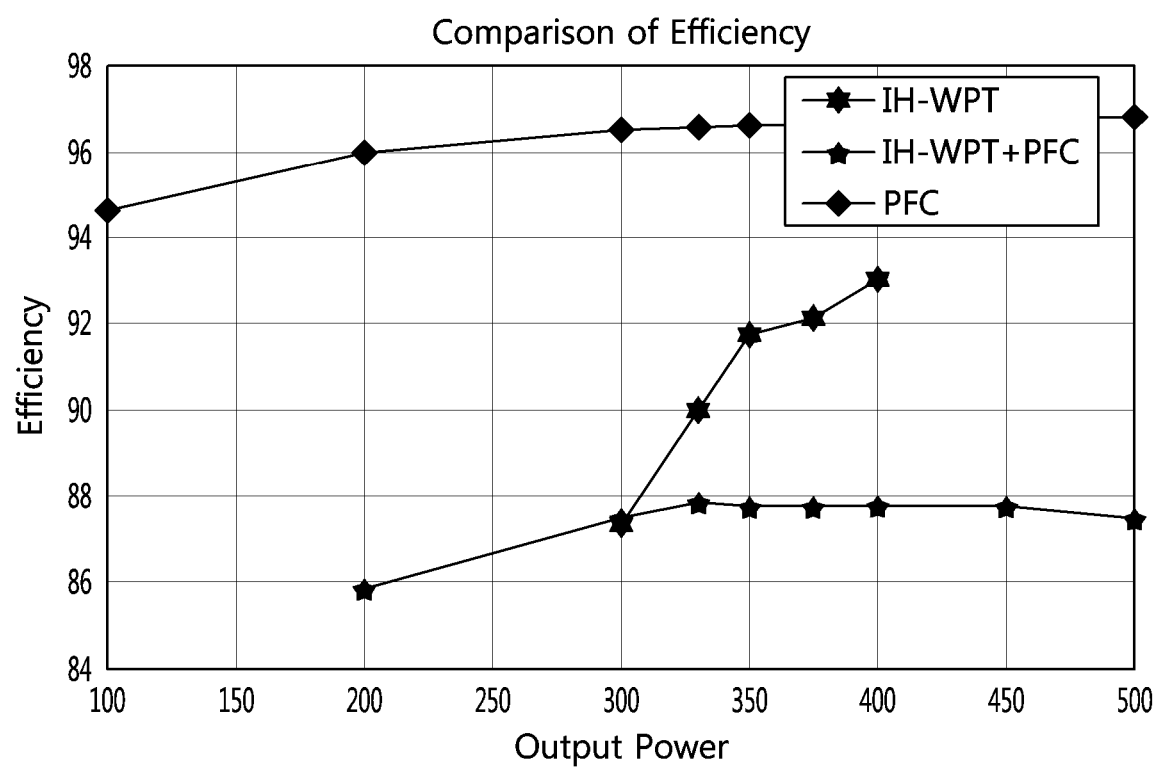
FIG. 15 is a diagram illustrating an example graph between an efficiency and output power of an induction heat cooking apparatus.
Figure 16:
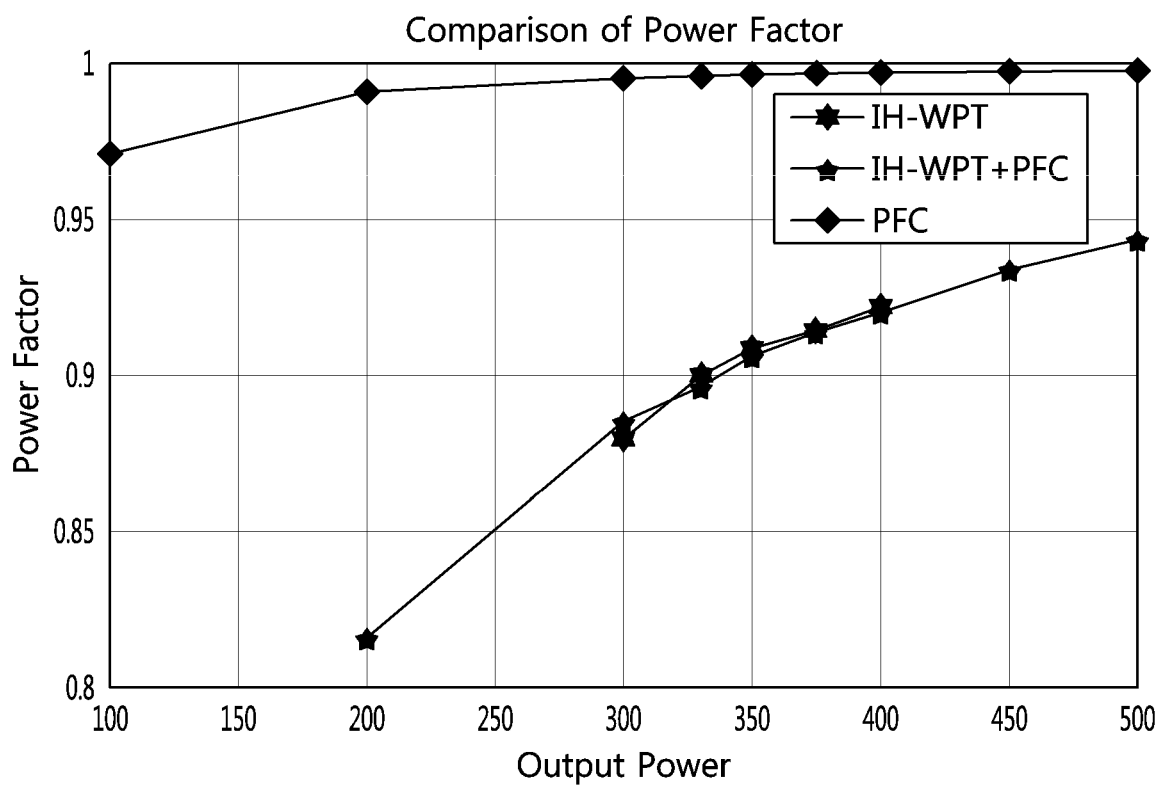
FIG. 16 is a diagram illustrating an example graph between a power factor and output power of an induction heat cooking apparatus.

FIG. 15 illustrates an example graph between an efficiency and output power of an induction heat cooking apparatus. FIG. 16 illustrates an example graph between a power factor and output power of an induction heat cooking apparatus.

A system of the induction heat cooking apparatus may include an induction heat cooking apparatus 100 and a secondary-side object. The secondary-side object may be heated or receive the wireless power according to operations of the mode conversion switches 180a and 180b provided in the induction heat cooking apparatus 100.

Referring to FIGS. 15 and 16, an IH-WPT graph indicates a case in which the wireless power is transferred to the heating coil 150 of the induction heat cooking apparatus 100. An IH-WPT+PFC graph indicate a case the wireless power is transferred to the heating coil 150 of the induction heat cooking apparatus 100, and the received power is converted through a PFC driving circuit. A PFC graph indicates a case in which efficiency and a power factor are measured by using the PFC circuit itself.

Referring to FIG. 15, all of the IH-WPT graph and the IH-WPT+PFC graph are measured to efficiency of about 86% or more. Also, referring to FIG. 16, all of the IH-WPT graph and the IH-WPT+PFC graph are calculated to a power factor of about 0.8 or more.

Thus, it is confirmed that the transfer of the wireless power is possible by using the induction heat cooking apparatus 100.

However, referring to FIG. 15, the efficiency according to the IH-WPT+PFC graph is less somewhat than that according to the IH-WPT graph. This is done because the efficiency according to the IH-WPT+PFC graph is efficiency measured when the variable load is driven, and the efficiency according to the IH-WPT graph is efficiency measured when the fixed load is driven. That is, the efficiency according to the IH-WPT+PFC graph is measured to a value less than that of the IH-WPT graph due to the addition of the PFC circuit.

However, referring to FIG. 16, it is confirmed that the power factor is improved through the PFC driving circuit from the case in which the power factor of the IH-WPT+PFC graph and the power factor of the IH-WPT graph are measured to values similar to each other.

As the present features may be implemented in several forms without departing from the characteristics thereof, it should also be understood that the above-described implementations are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

According to the various implementations, the induction heat cooking apparatus, which operates in the cooking device heating mode or the wireless power transfer mode, may be provided.

According to the various implementations, the resonance frequency may be adjusted through the WPT capacitor and the mode conversion switch to operate in the cooking device heating mode or the wireless power transfer mode through the same heating coil.

According to the various implementations, when the wireless power receiving device including the variable load receives the wireless power from the induction heat cooking apparatus, the wireless power receiving device may stably operate.

Although implementations have been described with reference to a number of illustrative implementations thereof, it should be understood that numerous other modifications and implementations can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. An induction heat cooking apparatus comprising:
   a rectifier that is configured to convert alternating current (AC) voltage supplied from an external power source into direct current (DC) voltage;
   an inverter that is configured to generate current based on DC voltage received from the rectifier and provide the current to output nodes;
   heating coils that are configured to, based on the current generated by the inverter, generate magnetic fields for providing heat;
   a first capacitive unit that includes one or more resonance capacitors and that is coupled between the output nodes;
   a second capacitive unit that includes one or more wireless power transfer (WPT) capacitors and that is configured to be coupled between the output nodes; and
   a mode conversion switch that is configured to couple the second capacitive unit to the first capacitive unit in parallel, and
   wherein the mode conversion switch is configured to be opened in a cooking device heating mode and closed in a wireless power transfer mode.

2. The induction heat cooking apparatus of claim 1, further comprising:
   a driving unit that is configured to open or close the mode conversion switch,
   wherein, in a state in which the mode conversion switch is closed, the first capacitive unit is coupled to the second capacitive unit in parallel, and
   wherein, in a state in which the mode conversion switch is opened, the first capacitive unit is decoupled from the second capacitive unit.

3. The induction heat cooking apparatus of claim 2, further comprising:
   a sensing unit configured to detect a type of an object that is located on the induction heat cooking apparatus,
   wherein the driving unit is configured to, based on the type of the object, control the mode conversion switch.

4. The induction heating cooking apparatus of claim 3, wherein the driving unit is configured to, (i) in a state in which the object is to be heated, open the mode conversion switch and, (ii) in a state in which the object is to receive wireless power, close the mode conversion switch.

5. The induction heat cooking apparatus of claim 2, further comprising:
   an interface unit that is configured to receive data about an operation mode of the induction heat cooking apparatus,
   wherein the driving unit is configured to, based on the operation mode of the induction heat cooking apparatus, control the mode conversion switch.

6. The induction heat cooking apparatus of claim 5, wherein the driving unit is configured to, (i) in a state in which the operation mode is the cooking device heating mode, open the mode conversion switch and, (ii) a state in which the operation mode is the wireless power transfer mode, close the mode conversion switch.

7. The induction heat cooking apparatus of claim 1, wherein the first capacitive unit comprises:
- a first resonance capacitor that is coupled between a first output node of the output nodes and a first node, and
- a second resonance capacitor that is coupled between the first node and a second output node of the output nodes,
- wherein the first node is coupled to the heating coils.

8. The induction heat cooking apparatus of claim 7, wherein the second capacitive unit comprises:
- a first WPT capacitor that is configured to be coupled to the first resonance capacitor in parallel, and
- a second WPT capacitor that is configured to be coupled to the second resonance capacitor in parallel.

9. The induction heat cooking apparatus of claim 8, wherein the mode conversion switch comprises:
- a first mode conversion switch that is configured to couple the first WPT capacitor to the first resonance capacitor in parallel, and
- a second mode conversion switch that is configured to couple the second WPT capacitor to the second resonance capacitor in parallel.

10. A system that includes an induction heat cooking apparatus and a secondary-side object, the induction heat cooking apparatus comprising:
- a rectifier that is configured to convert AC voltage supplied from an external power source into DC voltage;
- an inverter that is configured to generate current based on DC voltage received from the rectifier and provide the current to output nodes;
- heating coils that are configured to, based on the current generated by the inverter, generate magnetic fields;
- a first capacitive unit that includes one or more resonance capacitors and that is coupled between the output nodes;
- a second capacitive unit that includes one or more WPT capacitors and that is configured to be coupled between the output nodes; and
- a mode conversion switch that is configured to couple the second capacitive unit to the first capacitive unit in parallel,
- wherein, the mode conversion switch is configured to be opened in a cooking device heating mode and closed in a wireless power transfer mode,
- wherein, based on coupling between the first capacitive unit and the second capacitive unit, the secondary-side object receives heat or receives wireless power from the induction heat cooking apparatus.

11. The system of claim 10, wherein, (i) in a state in which the first capacitive unit is coupled to the second capacitive unit, the secondary-side object is heated by the induction heat cooking apparatus, and (ii) in a state in which, the first capacitive unit is decoupled from the second capacitive unit, the secondary-side object receives wireless power from the induction heat cooking apparatus.

12. The system of claim 10, wherein the secondary-side object comprises a wireless power receiving device.

13. The system of claim 12, wherein the wireless power receiving device is an electric heater.

14. The system of claim 12, wherein the wireless power receiving device comprises:
- a receiving coil configured to receive AC power from the heating coils; and
- a fixed load configured to be driven by using the received AC power.

15. The system of claim 12, wherein the wireless power receiving device is a device including a motor.

16. The system of claim 15, wherein the wireless power receiving device comprises:
- a receiving coil configured to receive AC power from the induction heat cooking apparatus;
- a variable load driven in a state in which a resistance value is not fixed; and
- a power factor correction, PFC, power converter configured to output a fixed voltage to the variable load by using the AC power supplied through the receiving coil.

17. The system of claim 16, wherein the PFC comprises:
- a secondary rectifier configured to rectify the AC power supplied through the receiving coil into DC power; and
- a PFC circuit configured to output the fixed voltage by using a waveform rectified through the secondary rectifier.

18. The system of claim 17, wherein the PFC circuit comprises:
- an inductor configured to receive an input voltage from the secondary rectifier;
- a FET switch configured to charge current into the inductor in a turn-on state and discharge the current charged in the inductor in a turn-off state;
- a PFC controller configured to control an operation of the FET switch; and
- an output capacitor, to which a voltage higher than the input voltage is applied when the current is discharged according to the operation of the FET switch, and absorbing a high frequency.

19. The system of claim 18, wherein the secondary rectifier is configured to be formed a diode bridge.

* * * * *